United States Patent [19]
Wilson

[11] Patent Number: 6,116,459
[45] Date of Patent: Sep. 12, 2000

[54] COFFEE FILTER DISPENSER

[76] Inventor: Charles E. Wilson, 43289 Osgood Rd., Fremont, Calif. 94539

[21] Appl. No.: 09/159,243

[22] Filed: Sep. 23, 1998

[51] Int. Cl.$^7$ ....................................................... B65H 3/00
[52] U.S. Cl. ............................................. 221/36; 221/259
[58] Field of Search ...................................... 221/259, 210, 221/55, 36, 45, 213, 59; 294/1.1, 118

[56] References Cited

U.S. PATENT DOCUMENTS 4,905,870   3/1990   Mamolou ................................ 221/210

Primary Examiner—Kenneth W. Noland
Attorney, Agent, or Firm—Armstrong Teasdale LLP

[57] ABSTRACT

Apparatus for dispensing paper articles, such as coffee filters, from a nested stack of such articles is described. In one embodiment, the apparatus includes an open-topped container and a separate lid having a mechanism for retrieving one coffee filter from a nested stack of filters. A pair of tabs are pivotally connected to the lid portion and extend through slots in the lid portion. A spring extends between the two tabs to maintain the tabs in an initial position. An elongate member depends from each tab, and the lower end of each member bears a contact surface bearing an adhesive or high friction material. In use, the tab upper ends are manually pivoted toward one another so that the elongate members bring the contact surface into an engaged position with the topmost filter in the stack. The lid is then withdrawn from the container with a single filter, leaving the remaining nested filters in the container.

17 Claims, 2 Drawing Sheets

COFFEE FILTER DISPENSER

FIELD OF THE INVENTION

This invention relates generally to dispensers of nested articles, and more particularly, to apparatus for dispensing single coffee filters from a nested stack of filters.

BACKGROUND OF THE INVENTION

Filter papers are widely used in a variety of industrial, scientific, and food preparation applications. In particular, filter papers are commonly used to prepare coffee beverages. The worldwide use of coffee filter papers has greatly increased over the past few decades due to the growing popularity and wide availability of automatic drip coffee makers.

Filter papers for automatic drip coffee makers typically are fabricated of thin paper and have a conical, or fluted and truncated conical shape, and are sold in tightly nested stacks of fifty to one hundred or more. Because of the tight nesting, thinness of the paper, and because the filter papers tend to adhere to one another, a common annoyance is to pull more than one filter paper from the stack. This is particularly a problem for the elderly and others with limited ability to manipulate the stack of filter papers.

Some known dispensers include a filter box or container having a hinged lid to which an elongate member, such as an arm, lever or plunger is connected. Typically, the elongate member has an abrasive, adhesive, spiked or sharply pointed end, and is pivotally or slidably connected to the lid so that the member may be moved to engage and remove the topmost filter as the lid is raised. Another known dispenser includes a box with a hinged lid having an adhesive coating on the underside, and a spring within the box. The spring biases an inverted filter stack toward the lid underside so that the topmost filter on the stack adheres to the lid underside and is removed from the stack when the lid is opened. Still another known dispenser includes a box with a manual crank arm which actuates a plurality of pronged or spiked grippers which grab the topmost filter. Yet another known dispenser uses compression bars to distort the shape of the filter stack to facilitate removal of the innermost filter.

However, some known dispensers are limited to use only with filters of a particular shape. In dispensers with hinged lids, operation typically depends on the hinged connection between the lid and the container or box holding the filters, so that such dispensers are not suitable for use with other filter containers. Dispensers which use prongs, spikes or compression bars may produce punctured or torn filters, or deformed filters which do not seat well in side the coffee filter basket, possibly negatively affecting the quality of coffee brewed with the filter. Dispensers which have crank arms or other relatively complex actuating mechanisms can be awkward to use, expensive to manufacture and awkward to store. There is a need for a simple, low-cost coffee filter dispenser.

It would therefore be desirable to provide an easily used, simple and low-cost dispenser for nested, cup-shaped paper articles such as coffee filters. It would also be desirable to provide such a dispenser which effectively engages the filters without the use of prongs or spikes. It would be further desirable to provide such a dispenser which is suitable for use with a variety of filter containers and also with a variety of filter configurations. It would be still further desirable to provide such a dispenser which does not deform the shape of the filters.

SUMMARY OF THE INVENTION

These and other objects may be attained by a coffee filter dispenser which, in one embodiment, includes an open-topped container and a separate lid. A retrieval mechanism, for retrieving one filter at a time from a nested stack of filters, depends from the lid. The retrieval mechanism includes a pair of manually operated tabs which are pivotally connected to the lid and extend through slots in the lid. The tabs are positioned so that their upper ends can pivot toward and away from one another. A spring extends between the two tabs to bias the tabs toward an initial position in which the upper ends of the tabs are pivoted away from one another. In an alternate, engaged position, the upper ends of the tabs are pivoted toward one another. An elongate member is coupled to each tab, and each member has a lower end to which a contact surface is attached. The contact surface bears an adhesive or high-friction material.

In use and in one embodiment, nested coffee filters are stored in the container and the dispenser lid prevents dust and other debris from accumulating on the stack of filters. During storage, the tabs remain in the initial position. With the tabs in the initial position, the elongate members hold the contact surfaces in a neutral position out of contact with the filter papers. A user desiring to retrieve a filter loosens the lid from the container and then pivots the upper ends of the tabs towards one another from the initial position to the engaged position, for example by grasping and pinching the tabs between a thumb and forefinger. Movement of the tabs to the engaged position moves the lower ends of the elongate members to a contact position in which the contact surfaces contact the top most filter. The lid is then withdrawn from the container, removing a single filter while leaving the remaining nested filters in the container.

The coffee filter dispenser described above provides a simply designed, easily used and low-cost dispenser for nested, cup-shaped paper articles such as coffee filters. In addition, the dispenser avoids the poking, tearing and deformation of filters caused by the use of prongs, spikes and compression bars. Further, the dispenser is suitable for use with a variety of filter containers, and with a variety of filter configurations and other nested paper articles.

DETAILED DESCRIPTION

Figure 1:
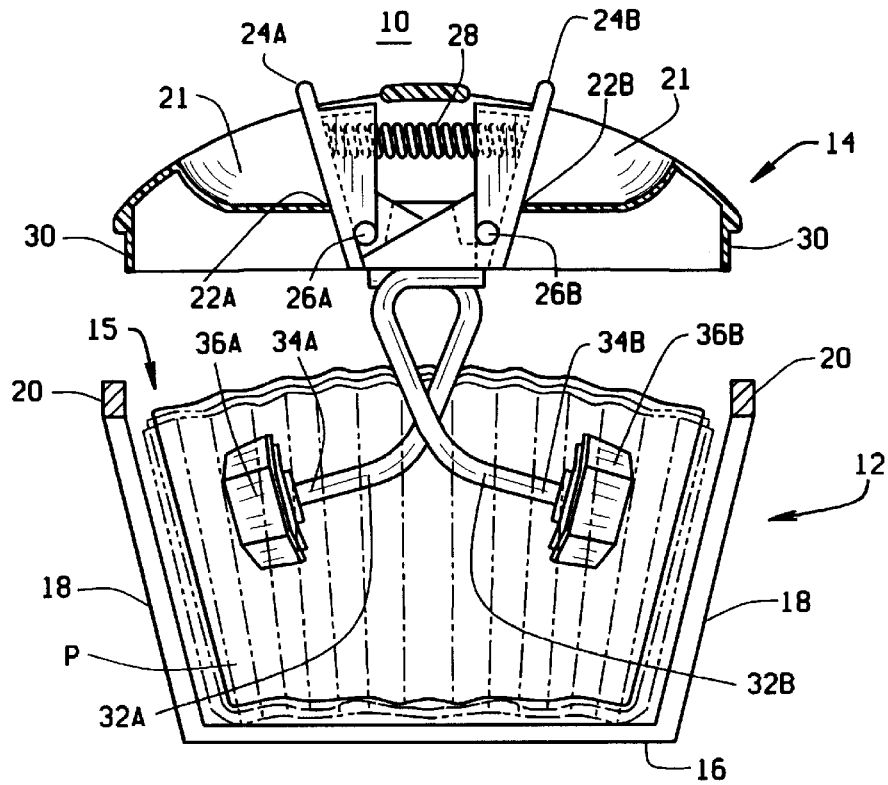
FIG. 1 is a cross-sectional view of a coffee filter dispenser generally including a lid and an open-topped container.

Referring now to the drawings, FIG. 1 is a cross-sectional view of one embodiment of a coffee filter dispenser 10. Dispenser 10 generally includes an open-topped container 12 and a lid 14. Container 12 has a generally cup-shaped configuration with a filter compartment 15. Container 12 includes a substantially flat circular base 16 from which a peripheral retaining wall 18 extends upwardly. Wall 18 slopes outwardly from base 16 and the top of wall 18 defines a substantially circular opening (not shown) to filter compartment 15. A circular rim 20 is attached to the top of wall 18. Container 12 is configured to hold within filter compartment 15 a stack P of about one hundred fluted, truncated conical coffee filters for automatic drip coffee-makers. The coffee filters are generally configured with substantially vertical side walls.

Lid 14 has a substantially circular, domed configuration and is configured to close the open top of container 12. Lid 14 includes a well portion 21. Within well portion 21 are a pair of slots 22A and 22B. A pair of tabs 24A and 24B, each having an upper and a lower end, are pivotally connected to the underside of lid 14 by pin elements 26A and 26B. Tabs 24A and 24B extend respectively through slots 22A and 22B. More specifically, in one embodiment, pin elements 26A and 26B extend through holes in tabs 24A and 24B and into a solid block portion (not shown) which depends from the underside of well portion 21. Pin elements 26A and 26B may be, for example, hinge pins, cotter pins or the like. A spring 28 extends horizontally between tabs 24A and 24B to bias the upper ends of tabs 24A and 24B away from one another toward an initial position on the pivotal connections of tabs 24A and 24B to lid 14. A circular flange 30 extends from the underside of lid 14. Flange 30 is configured to insert into rim 20 so that lid 14 closes the open top of container 12.

Two substantially L-shaped members 32A and 32B depend respectively from tabs 24A and 24B. Members 32A and 32B are configured so that their lower ends, 34A and 34B respectively, are oriented radially outwards from the central axis of dispenser 10. Contact elements 36A and 36B are attached respectively to the lower ends of members 32A and 32B. In one embodiment, contact elements 36A and 36B include a surface bearing an adhesive material such as, for example, a low-tack rubberized adhesive. Alternatively, contact elements 36A and 36B may include a surface bearing a high friction material such as rubber or sand paper. Contact elements 36A and 36B may vary in shape and size, limited only by the requirement that they provide enough surface area for making adhesive or frictional contact with the filter papers.

Container 12, lid 14, tabs 24A and 24B, members 32A and 32B, and contact elements 36A and 36B are fabricated from injection molded plastic, such as, for example, polypropylene or the like. Pin elements 26A and 26B and spring 28 are also fabricated from injection molded plastic, or alternatively may be fabricated from metal. Tabs 24A and 24B and pin elements 26A and 26B are assembled by positioning tabs 24A and 24B in slots 22A and 22B and inserting pin elements 26A and 26B respectively through the holes in tabs 24A and 24B and into the solid block portion on the underside of lid 14. Contact elements 36A and 36B are attached respectively to lower ends 34A and 34B of members 32A and 32B with epoxy. Alternatively, members 32A and 32B and contact elements 36A and 36B may be molded as a unit from plastic. Members 32A and 32B are attached to tabs 24A and 24B with an epoxy, and the adhesive or high friction material on contact elements 36A and 36B is also attached with an epoxy.

Figure 2:
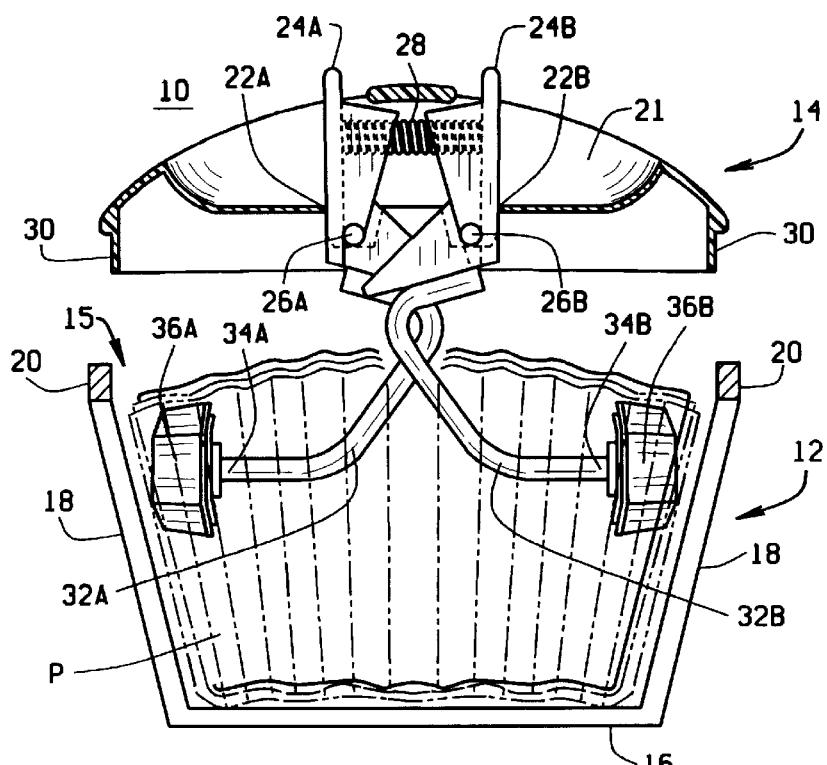
FIG. 2 is a cross-sectional view of the coffee filter dispenser showing a pair of contact surfaces in a contact position relative to a paper filter.

FIG. 1 shows dispenser 10 with members 32A and 32B maintaining contact elements 36A and 36B in a neutral position relative to a top most paper filter. In the neutral position, contact elements 36A and 36B make no contact with filter stack P. In contrast, FIG. 2 is a cross-sectional view of lid 14 showing members 32A and 32B holding contact elements 36A and 36B in a contact position relative to the top most filter paper. In the contact position, contact elements 36A and 36B make direct contact with the side walls of the top most filter paper.

Figure 3:
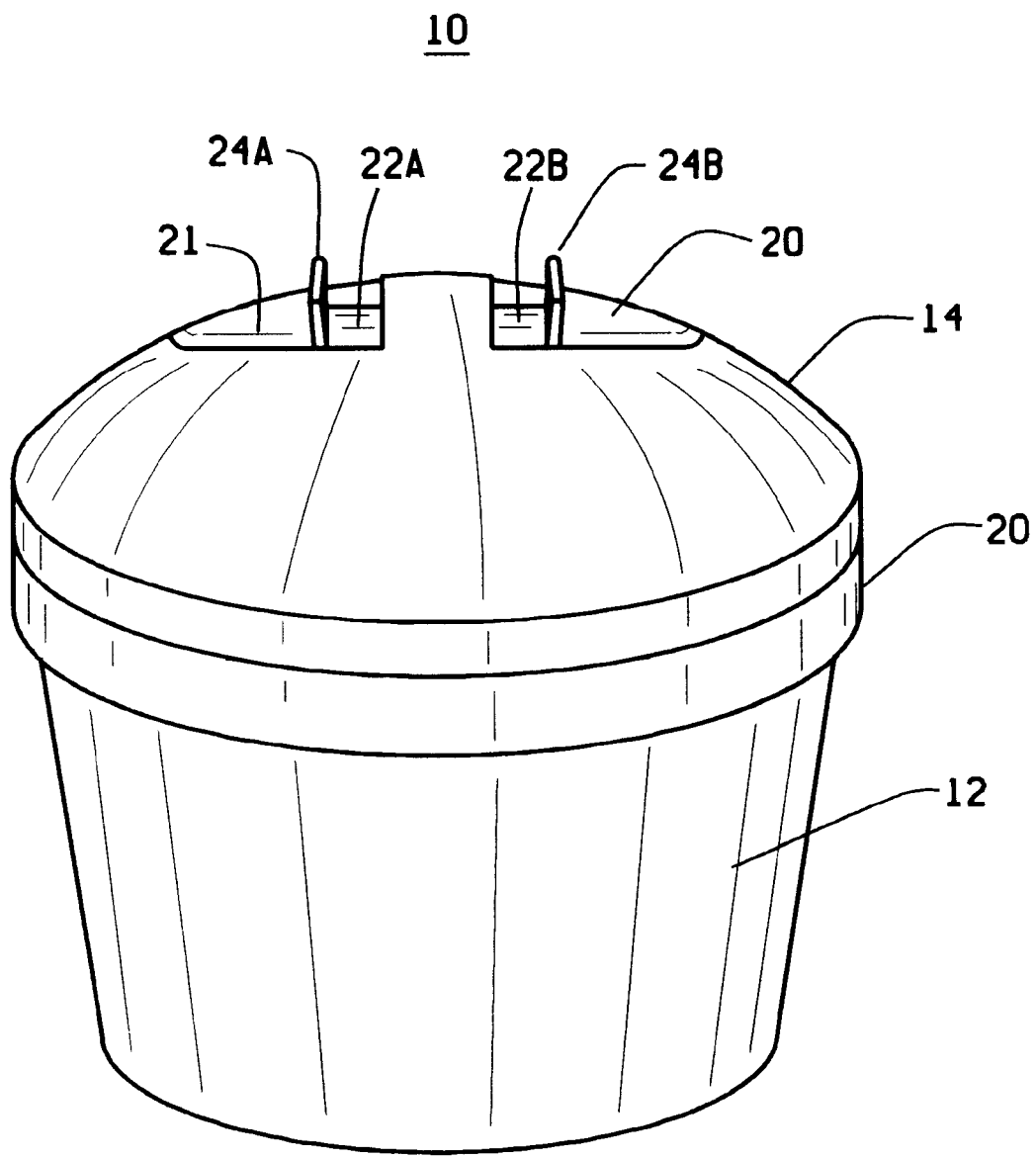
FIG. 3 is a perspective view of the coffee filter dispenser with the lid enclosing the open top of the container.

In use and referring now to FIG. 3, dispenser 10 is normally stored with lid 14 seated on container 12. Flange 30 (not shown in FIG. 3) is inserted into rim 20 and frictional forces between flange 30 and rim 20 hold lid 14 in place. To retrieve the top most filter paper, a user first loosens lid 14 from container 12, for example by manually grasping and tugging lid 14 to overcome the frictional forces between flange 30 and rim 20. The user then pivots the upper ends of tabs 24A and 24B towards one another to the engaged position, for example by grasping and pinching the tabs between a thumb and forefinger. As the upper ends of tabs 24A and 24B pivot towards one another on pin elements 26A and 26B, the lower ends of tabs 24A and 24B pivot away from one another so that members 32A and 32B bring contact elements 36A and 36B to the contact position in which contact elements 36A and 36B contact the inner side walls of the top most filter paper. The filter paper adheres to the adhesive material on contact elements 36A and 36B and is retrieved singly from stack as lid 14 is withdrawn from container 12. Alternatively, lid 14 may be loosened from container 12 after contact elements 36A and 36B make contact with the filter paper.

In an alternative embodiment of dispenser 10, contact elements 36A and 36B bear high friction material such as rubber or sand paper. The user loosens lid 14 from container 12 and manually moves the upper ends of tabs 24A and 24B towards one another, so that members 32A and 32B bring contact elements 36A and 36B to the engaged position. While contact elements 36A and 36B are maintained in the engaged position by continued manual pressure on tabs 24A and 24B, lid 14 is withdrawn from container 12 so that frictional forces between contact elements 36A and 36B and the side walls of the top most filter paper cause the filter paper to slide up and over the remaining papers in stack P below. The top most paper is thereby loosened from stack P and easily manually retrieved.

Use of lid 14 is not limited to use with container 12. Lid 14 may be used independently of container 12 by inserting members 32A and 32B into the center of a filter stack contained in any one of a number of commonly used filter paper containers, boxes or packages. Generally, the dimensions of container 12, or the choice of an alternate container is limited only by the requirement that the container maintain the filter papers in a sufficiently cupped configuration such that contact elements 36A and 36B can make contact with substantially vertical side walls of filter papers.

In alternate embodiments, the dimensions and shape configurations of container 12, lid 14, tabs 24A and 24B, members 32A and 34B, and contact elements 36A and 36B may be varied to work with a different filter shape, or to adapt the dispenser for mounting on a vertical wall. For example, lid 14 may be any size or shape configuration, limited only by the requirement that lid 14 be able to close the open top of container 12. Slots 22A and 22B may instead be a single opening through lid 14. Container 12 may further include an internal retaining lip or multiple retaining projections projecting inwardly from wall 18 or rim 20 to retain the filter paper stack within container 12 while container 12 is being manipulated, or to allow container 12 to be mounted on a vertical surface such as a wall or cabinet. Contact elements 36A and 36B may curved or otherwise shaped to conform to different curvatures of different sized or shaped coffee filters. Flange 30 and rim 20 may be further configured with threads to form a screw top seal between lid 14 and container 12. Alternatively, flange 30 may be absent and lid 14 configured to close the top of container 12 by simply resting on top of rim 20 or on the top of another suitable container. In an alternate use, dispenser 10 may be used for the retrieval of other substantially cup-shaped paper articles which are commonly sold in nested stacks, such as, for example, paper cups or bowls.

The coffee filter dispenser configurations described herein provide a simply designed, easily used and low-cost dispenser for substantially cup-shaped paper articles, particularly including coffee filters. The dispenser does not poke, tear or deform filters as do the prongs, spikes and compression bars employed in known dispensers. In addition, the dispenser is suitable for use with a variety of filter containers, and with a variety of filter configurations and other nested paper articles.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. Apparatus for removing a topmost paper article having substantially vertical side walls from a nested stack of such articles, said apparatus comprising:

an open-topped container for the stack;

a lid configured to close the open top of said container, said lid having at least one opening therethrough;

a pair of tabs extending through said at least one opening, said tabs having upper ends and pivotally connected to said lid so that the tab upper ends can pivot toward one another from an initial position in which the tab upper ends are biased away from one another;

a spring extending between said tabs, said spring configured to bias the upper ends of said tabs away from one another so that said tabs are maintained in the initial position;

a pair of elongate members, one of said members depending from one of said tabs, the other of said members depending from the other of said tabs, said members each having a lower end, wherein said members are configured so that the lower ends move to an engaged position relative to the paper article when the upper ends of said tabs are moved against the spring; and at least two contact elements for contacting the article, at least one of said at least two contact elements coupled to the lower end of each of said elongate members, said at least two contact elements configured to contact the substantially vertical side walls of the topmost article when said member lower ends are in the engaged position.

2. Apparatus in accordance with claim 1 wherein said elongate members comprise substantially L-shaped members.

3. Apparatus in accordance with claim 2 wherein said lower ends of said substantially L-shaped members are oriented radially outwards from a central axis of said container.

4. Apparatus in accordance with claim 1 wherein said container has a truncated, substantially conical configuration, said container further comprising:

a substantially flat circular base;

a peripheral retaining wall extending upwardly from said base, said wall having a top; and a circular rim attached to the top of said retaining wall.

5. Apparatus in accordance with claim 1 wherein the articles comprise coffee filters, said container configured to hold a stack of up to about 100 coffee filters.

6. Apparatus in accordance with claim 1 wherein said at least two contact elements comprise surfaces bearing an adhesive material.

7. Apparatus in accordance with claim 6 wherein said adhesive material comprises a low-tack, rubberized adhesive.

8. Apparatus in accordance with claim 1 wherein said at least two contact elements comprise surfaces bearing a high friction material.

9. Apparatus in accordance with claim 8 wherein said high friction material comprises a rubber composition.

10. Apparatus in accordance with claim 8 wherein said high friction material comprises sand paper.

11. Apparatus in accordance with claim 1 wherein said at least one lid opening comprises a pair of slots, wherein one of said tabs extends through one of said slots and the other of said tabs extends through the other of said slots.

12. Apparatus for removing a topmost paper article having substantially vertical side walls from a nested stack of such articles, the articles stored in an open-topped container, said apparatus comprising:

a lid for covering the top of the container, said lid having at least one opening therethrough;

a pair of tabs extending through said at least one opening, said tabs having upper ends and pivotally connected to said lid so that the tab upper ends can pivot toward one another from an initial position in which the tab upper ends are biased away from one another;

a spring extending between said tabs, said spring configured to bias the upper ends of said tabs away from one another so that said tabs are maintained in the initial position;

a pair of substantially L-shaped members, one of said members depending from one of said tabs, the other of said members depending from the other of said tabs, said members each having a lower end and wherein said members are configured so that the lower ends move to an engaged position relative to the article when the upper ends of said tabs are moved against the separating force of said spring; and a pair of contact elements for contacting the article, said contact elements coupled to the lower ends of said L-shaped members, said contact elements configured to contact the substantially vertical side walls of the topmost article when said member lower ends are in the engaged position.

13. Apparatus for retrieving a cup-shaped paper article from a stack of such articles, said apparatus comprising:

a container means for containing the filter stack, said container means having an open end;

a lid for closing said open end of said container means, said lid having at least one opening therethrough;

a pair of tabs extending through said at least one opening, said tabs having upper ends and pivotally connected to said lid so that the tab upper ends can pivot toward one another from an initial position in which the tab upper ends are biased away from one another;

a spring extending between said tabs, said spring configured to bias the upper ends of said tabs away from one another so that said tabs are maintained in the initial position;

a pair of elongate members, one of said members depending from one of said tabs, the other of said members depending from the other of said tabs, said members each having a lower end, wherein said members are configured so that the lower ends move to an engaged position relative to the paper article when the upper ends of said tabs are moved against the spring;

at least two contact elements for contacting the article, at least one of said contact elements coupled to each of said elongate members, said contact elements configured to contact the substantially vertical side walls of the topmost article when said member lower ends are in the engaged position.

14. Apparatus in accordance with claim 13 wherein said container means comprises a substantially cup-shaped container having an open top.

15. Apparatus in accordance with claim 13 wherein said container means comprises a commercially available filter package.

16. Apparatus in accordance with claim 13 wherein said contact elements comprise a surface bearing an adhesive material.

17. Apparatus in accordance with claim 13 wherein said contact elements comprise a surface bearing a high friction material.

\* \* \* \* \*